(12) United States Patent
Ali et al.

(10) Patent No.: US 7,028,138 B2
(45) Date of Patent: Apr. 11, 2006

(54) RAID CONFIGURATION PROTOCOL FOR SCSI DRIVES AND RAID CONTROLLERS

(75) Inventors: Ahmad A. J. Ali, Austin, TX (US); Ahmad Hassan Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 10/352,574

(22) Filed: Jan. 28, 2003

(65) Prior Publication Data

US 2004/0148459 A1    Jul. 29, 2004

(51) Int. Cl.
*G06F 12/00* (2006.01)

(52) U.S. Cl. .............. 711/114; 711/154; 711/156; 711/163; 711/170

(58) Field of Classification Search .......... 711/114, 711/154, 156, 163, 170
See application file for complete search history.

(56) References Cited

U.S. PATENT DOCUMENTS

| | | | |
|---|---|---|---|
| 5,822,782 A | 10/1998 | Humlicek et al. | 711/170 |
| 5,835,694 A | 11/1998 | Hodges | 395/182.04 |
| 5,960,451 A | 9/1999 | Voigt et al. | 711/114 |
| 6,023,780 A | 2/2000 | Iwatani | 714/770 |
| 6,052,759 A | 4/2000 | Stallmo et al. | 711/114 |
| 6,108,671 A * | 8/2000 | Ogawa | 707/204 |
| 6,138,176 A | 10/2000 | McDonald et al. | 710/6 |
| 6,275,898 B1 | 8/2001 | DeKoning | 711/114 |
| 6,289,398 B1 | 9/2001 | Stallmo et al. | 710/5 |
| 6,321,294 B1 | 11/2001 | Perry | 711/114 |
| 6,338,110 B1 | 1/2002 | Van Cruyningen | 710/131 |
| 6,839,824 B1 * | 1/2005 | Camble et al. | 711/173 |
| 2003/0051078 A1 * | 3/2003 | Yoshitake | 710/9 |

OTHER PUBLICATIONS

"TechEncyclopedia", term "RAID" entry, http://www.techweb.com/, pp 1–7, printed Jun. 17, 2005.*

* cited by examiner

*Primary Examiner*—Stephen C. Elmore
(74) *Attorney, Agent, or Firm*—Baker Botts L.L.P.

(57) ABSTRACT

A method and system are provided for implementing a redundant array of independent devices ("RAID") having disparate SCSI configurations and capabilities. A portion of the memory of each SCSI device of the RAID set is reserved for RAID configuration information. In one embodiment, a SCSI RAID controller is provided with a protocol for accessing user information and RAID configuration information on the SCSI devices. By reserving RAID configuration information at a common place on each SCSI device, control and configuration of the RAID array is simplified and unified. Unified configuration of the RAID members enables utilization of devices from disparate manufacturers.

24 Claims, 5 Drawing Sheets

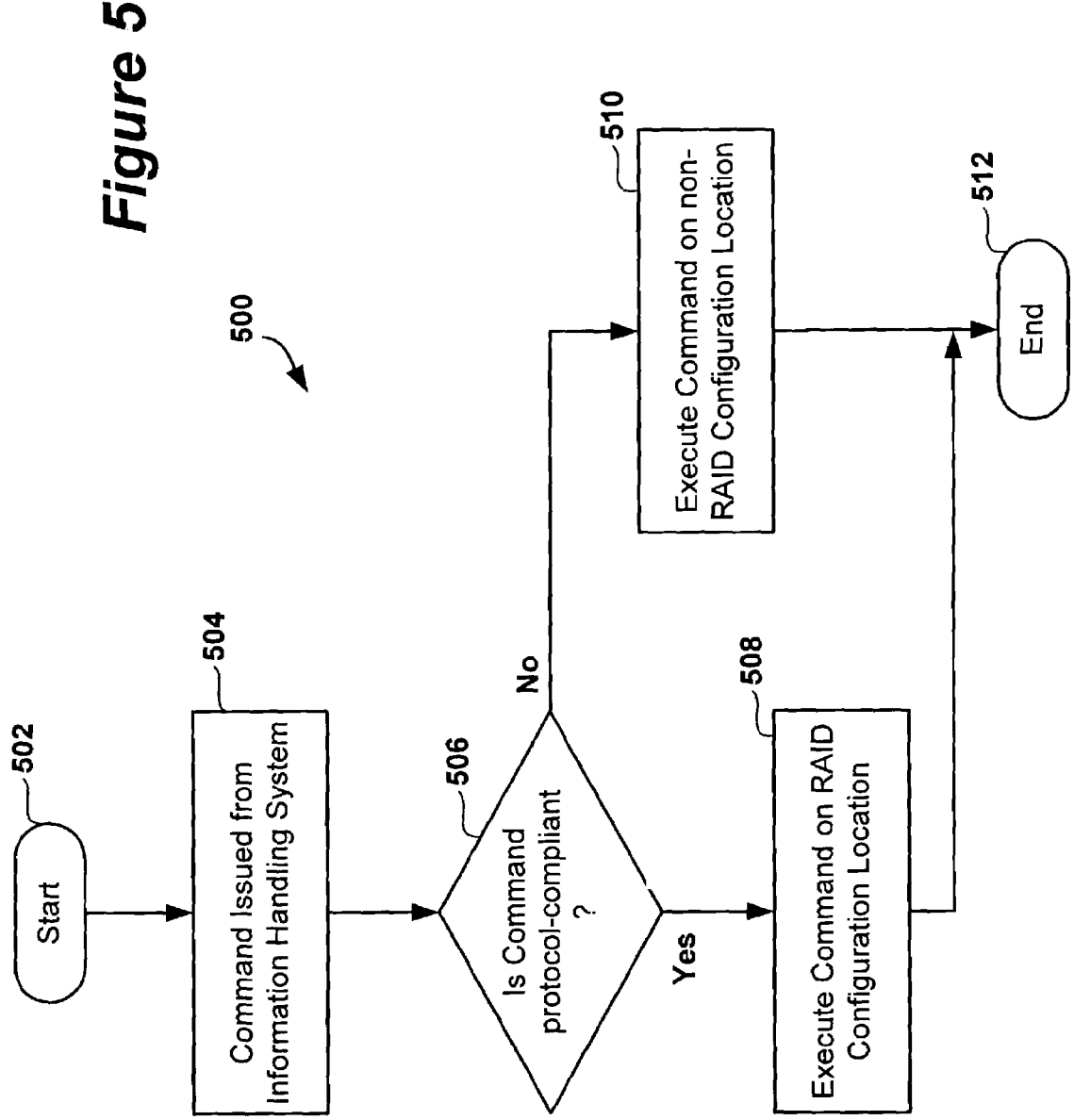

RAID CONFIGURATION PROTOCOL FOR SCSI DRIVES AND RAID CONTROLLERS

TECHNICAL FIELD

The present disclosure relates generally to the field of computer storage, and, more particularly, to a system and method for storing information in a redundant array of information devices (RAID) having SCSI drives and controllers from disparate vendors.

BACKGROUND

As the value and use of information continues to increase, individual and businesses seek additional ways to process and store information. One storage option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, store, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

U.S. Pat. No. 6,052,759 to Stallmo et al. describes a redundant array of independent disks ("RAID") system adapted to host input-output ("I/O") traffic. The RAID configuration of Stallmo is hidden from the host computer. The Stallmo system uses various methods for disk striping and data organization across the arrays when the disks are added or removed. The system of Stallmo dynamically determines the RAID configuration used to store host data. The system of Stallmo is useful for situations where the disks have unequal storage capacity and the data needs to be distributed to different RAID formats depending on the size of the rectangles containing the sets of storage on the disk. Such a situation is encountered when some disks are in RAID 1 configuration, other disks are in RAID 3 configuration, and still other disks are in RAID 5 configurations.

U.S. Pat. No. 6,338,110 B1 to van Cruyningen describes a data storage system having multiple storage channels and one or more controllers. The van Cruyningen system contains a partitioning mechanism and essentially partitions the storage channels using a set of programmable switches.

U.S. Pat. No. 6,321,292 B1 to Perry teaches of a method for converting between logical and physical memory spaces that adapts to different RAID types and configurations in a modularized form. The teachings of Perry are useful for reconfiguring logical and physical memory space within a RAID system.

U.S. Pat. No. 6,289,398 B1 to Stallmo et al. discloses a RAID-compatible data storage system that allows incremental increases in storage capacity that is proportional to the increase in the storage capacity. This particular system is unusual in that it does not require changes to the host system. Instead of changes to the host system, the controller implements functions that were previously performed by a single or redundant central data storage controller. The controller functions are distributed among a number of modular controller units. Each of the modular controller units is physically coupled to a data storage device to form a basic, low-cost integrated storage node.

U.S. Pat. No. 6,279,898 B1 to DeKoning discloses a method and structure for defining partitions within a RAID storage system such that each partition is managed in accordance with RAID management techniques that are independent of the partitions. According to DeKoning, the total data storage of the logical unit is subdivided and mapped into a plurality of partitions that are referred to as "partitions." Initially, each partition is configured and mapped to run as a RAID level 1 mirrored storage area. However, as performance and storage capacity needs are measured for each partition, a partition of the system may be reconfigured to use a different RAID level, i.e., level 3 or level 5, to reduce overall storage needs and the cost of decreasing RAID performance. Later, a partition may be returned to the RAID level 1, as performance needs increase. According to DeKoning, each partition is managed in accordance with its own RAID level of management.

U.S. Pat. No. 6,023,780 to Iwatani provides a disk array apparatus that checks and determines that if there is a contradiction in the matching of parity data during a read parity check, then the correct host data is restructured such that it can always be transferred to the host. For example, if a disk array implements a RAID level 3, then the disk array apparatus adds cyclic redundancy check ("CRC") data to the data that is transferred from the host computer, divides the data, generates parity from the divided data, and then stores the data and the parity data onto the disk drives. According to Iwatani, during a read operation, the disk array apparatus executes a read parity check. If there is a contradiction detected between the parity data stored in the disk drives and the parity data generated during the read parity check, then the disk array controller sequentially assumes, by one disk drive at a time, that one of the disk drives is storing erroneous data. The controller then restructures the host data from the divided data and parity data of the disk drives other than the disk drives storing the assumed erroneous data, and executes a CRC check on the restructured host data for each assumption.

U.S. Pat. No. 5,960,451 to Voight et al. provides a data storage system that includes an administrator tool that presents an existing Logical Unit Number ("LUN") arrangement that is composed of one or more types of LUNs and the available capacity for the existing LUN arrangement. The administration tool in Voight provides a graphical user interface that allows the administrator to proposed alternate configurations with either one or more additional virtual or hypothetical LUNs without, in fact, creating them. The graphical user interface of Voight provides a set of controls that is representative of the different LUN types. This allows the administrator to graphically manipulate the controls to vary characteristics of the hypothetical LUNs.

U.S. Pat. No. 5,835,694 to Hodges provides a data processing system that includes a host processor or server and a connection to an array of disk drives, all on a network. In Hodges, each disk drive stores an array configuration page that includes data that identifies the logical memory segment size, the first identifier for the disk drive that incorporates the respective memory segment, and a second identifier for the last disk drive which stores parity for the parity setting, including the logical memory segment. Each disk drive, according to Hodges, includes a controller for determining, from the logical memory segment size and the second identifier, which logical memory segment in the respective memory stores the parity data. According to Hodges, the controller responds to an address accompanying the read or write command by mapping the address for a logical memory segment other than the logical memory segment in the respective memory which stores the parity data. Moreover, on performing a write action to a logical memory segment, the controller in Hodges communicates directly with the disk drive that stores parity for the parity set of which the logical memory segment is a part, and thereby causes an update of that parity segment in accordance with the write action.

U.S. Pat. No. 5,882,782 to Humlicek et al. provides a RAID subsystem with improved performance by storing configuration identification information on a reserved area of each disk drive in the subsystem. The reserved area in each disk drive of the disk array contains a unique identifier to identify the particular disk drive from all others and further contains group and configuration information regarding all groups of which the particular disk drive is a member. The configuration identification information is generated and written to each disk drive in the disk array when the particular disk drive is configured, so as to be added or deleted from groups of the subsystem. For situations such as a subsystem reset (e.g., from a power on reset, or other reset operations), the RAID controller in the subsystem determines the proper configuration of the RAID groups, despite temporary unavailability or physical relocation of one or more of the disk drives in the disk array. In addition, entire groups of disk drives may be moved from one subsystem to another and automatically recognized by the new controller when the new controller is reset.

While the prior art exhibits certain functionality of RAID systems, it fails to provide a RAID system other than one having uniform devices for storage. In other words, each hard disk used in the RAID system must be provided from the same manufacturer so that the disk configuration information can be accommodated by the RAID controller. This places a constraint on manufacturers of RAID systems and upon manufacturers of RAID controllers. Many possible combinations of controller and disks could be used, but for the constraint of uniform storage devices. There is, therefore, a need in the art for a RAID storage system without the constraints of uniform storage devices and/or requirements for specific controllers for those storage devices.

SUMMARY OF THE INVENTION

In accordance with the present disclosure, a method and system is provided for implementing a RAID array having disparate SCSI disk drives. Moreover, the present disclosure provides a RAID implementation that is independent of the particular RAID controller. The present disclosure provides a mechanism for storing configuration information for SCSI devices. The present disclosure also provides a protocol for interacting between small computer system interfaces ("SCSI") devices such as SCSI hard disks and Redundant Array of Independent (or Inexpensive) Disks ("RAID") controllers, such that the SCSI hard disks and are independent of the controller, and the controller is independent of the various SCSI hard disks. The present invention thus enables a heterogeneous mixture of SCSI disk drives and RAID controllers, all for different vendors.

The system of the present disclosure operates through a protocol that requires the SCSI hard disks to maintain the RAID configuration information on a particular portion of the hard disk. According to the protocol, the area containing the RAID information on the hard disk is not accessible to the user programs and applications. Moreover, the SCSI hard disks are configured such that specific commands that are received from the SCSI controller are implemented on the particular portion of the hard disk that contains the RAID configuration according to the protocol on the present disclosure. The SCSI controller can be any industry standard controller that adheres to the protocol of the present disclosure. The SCSI RAID controller of the present disclosure shall, either through software or hardware, be able to issue proper commands according to the protocol to the SCSI hard disk, such that read and write commands are properly implemented across the RAID array, and commands specific to the RAID configuration access those portions of the SCSI hard disk that are reserved for RAID configuration.

At least one technical advantage of the present disclosure is that SCSI devices of different sizes, and different manufacturers can be used with any RAID controller that conform to the protocol disclosed herein.

Another technical advantage of the present disclosure is that the same functionality with disparate hard disks can be achieved without the need for a separate RAID controller. Instead of using a RAID controller, a kernel module or the like may be used to perform the functions of a protocol-compliant RAID controller, again without having to accommodate vendor-specific variations in the storage devices.

Yet another technical advantage of the present disclosure is that RAID controllers from different vendors can be implemented on existing RAID configurations without affecting user data.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 is a flow chart illustrating the method of utilizing the protocol-compliant RAID system according to the teachings of the present disclosure.

DETAILED DESCRIPTION

The present disclosure describes a mechanism for storing configuration information for SCSI devices. The present disclosure also describes a protocol for retaining RAID information on common portions of mass storage devices, such as a SCSI disk drive. The mechanism and protocol of the present disclosure are able to utilize disk drives from different manufacturers and/or different capacities. Moreover, the mechanism and protocol of the present disclosure enable the use of RAID controllers without regard to particular disk drives so long as the RAID controller also conforms to the protocol of the disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
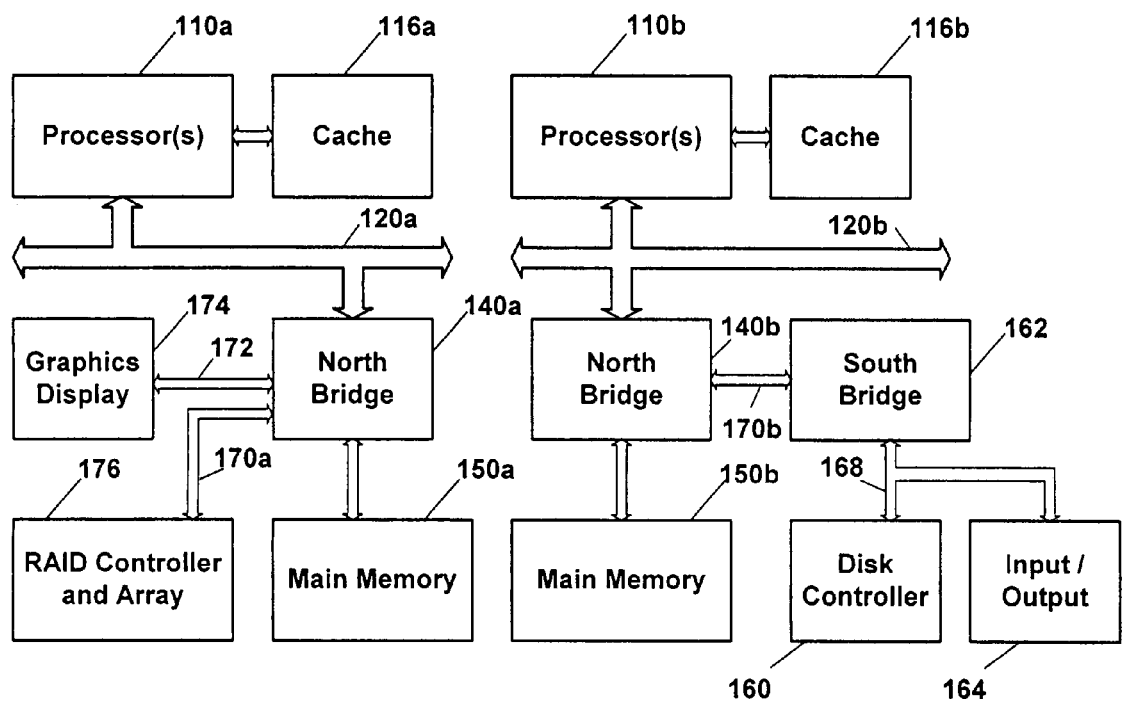
FIG. 1 is a block diagram of a prior art information handling system.

Shown in FIG. 1 is an information handling system having a RAID array. In one embodiment, the information handling system is a computer system. The information handling system, generally referenced by the numeral 100, comprises one or more processors 110 coupled to one or more host buses 120 and a cache memory 116. One or more north bridges 140, which may also be referred to as a "memory controller hub" or a "memory controller," are coupled to a main system memory 150. The north bridge 140 is coupled to the system processor(s) 110 via the host bus(es) 120. The north bridge 140 is generally considered an application specific chip set that provides connectivity to various buses, and integrates other system functions such as memory interface. For example, an Intel 820E and/or 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus, e.g., PCI bus 170, AGP bus 172 (coupled to graphics display 174), etc. The second bus may also include other industry standard buses or proprietary buses, e.g., ISA, SCSI, USB buses 168 through a south bridge (bus interface) 162. These secondary buses 168 may have their interfaces and controllers, e.g., ATA disk controller 160 and input/output interface(s) 164.

The information handling system 100 also has a RAID controller and array subsystem 176 that is operative with the north bridge 140a via bus 170a as illustrated in FIG. 1. Alternate embodiments of the invention (as described below) can eliminate the RAID controller and simply interact directly with the RAID subsystem 176.

Figure 2:
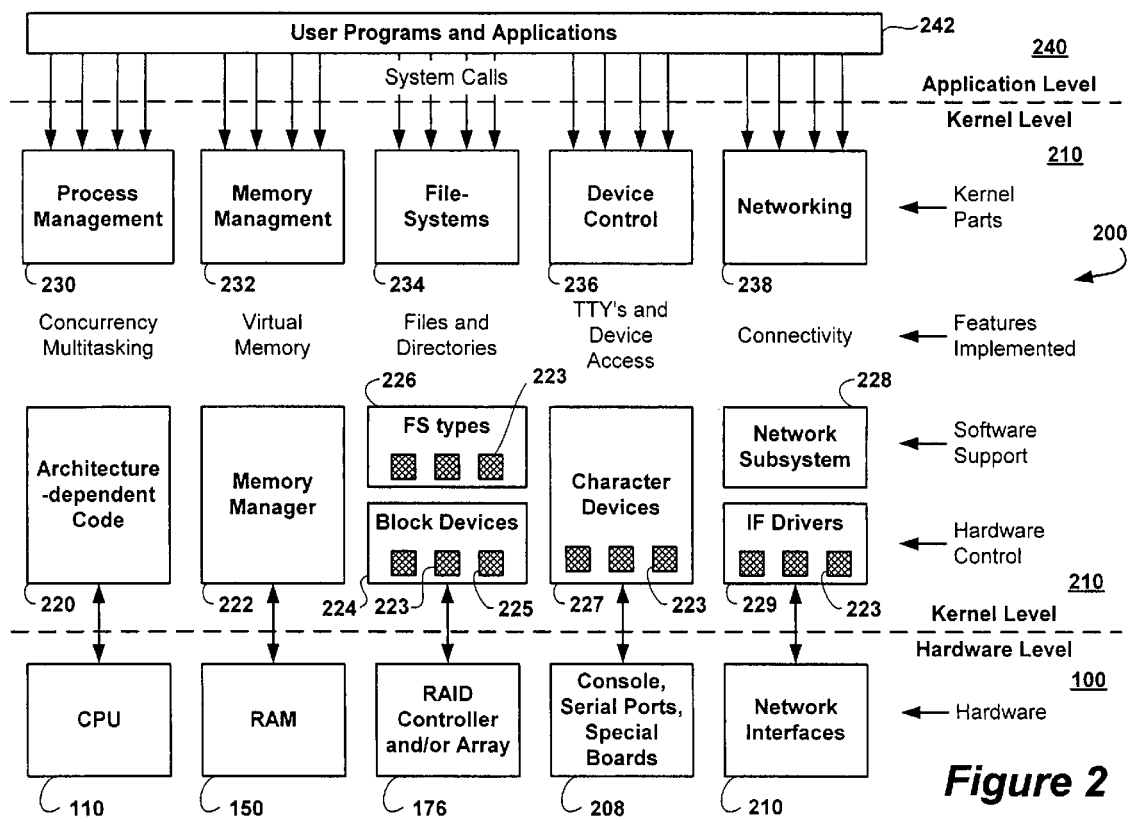
FIG. 2 is a block diagram illustrating an operating system kernel configuration within the prior art information handling system of FIG. 1.

Shown in FIG. 2 is a block diagram of the software system 200 that operatives on the information handling system 100 to perform various functions and operations. The software system 200 can be divided into three levels, namely the hardware level 100 that corresponds to the information handling system 100, the kernel level 210 that corresponds to an operating system kernel, such as LINUX® (a registered trademark of Linus Torvolds), which is available via the Internet at http://www.kernel.org/. On top of the kernel level 210 lies the application level 240, wherein various user programs and other applications 240 interact with the kernel level 210 through system calls as illustrated in FIG. 2. The kernel 210 itself has a variety of kernel parts that are exposed to the user programs and applications 240 (via system calls). Common kernel parts include process management 230, memory management 232, file-systems 234, device control 236, and networking 238. The kernel parts implement features, such as concurrency multitasking, virtual memory management, files and directories of, e.g., mass storage devices, terminals that are connected standard input devices ("TTY") and other device access, and operational connectivity. In order to translate the features into action by the hardware 100, the kernel level 210 includes a set of software support features, such as file-system types 226 (having modules 223 for the various file system types such as ext2, ext3, swap, reiserfs, etc.), and the network subsystem 228. Other features are implemented by hardware controls, such as block devices 224 and IF drivers 229. Still other features are implemented in a mix of software support and hardware controls, such as the architecture-dependent code 220, the memory manager 222, and the character devices 227.

One of the excellent features of the LINUX® kernel is that its functionality can be expanded at run time. Each piece of code that is added to extend the kernel's functionality is called a module. The LINUX® kernel offers support for many types (or "classes) of modules, including, but not limited to, device drivers. Each module is made up of object code (in lieu of a complete executable) that can be linked dynamically to the kernel. FIG. 2 shows various modules 223 and 225 for the various support software and/or hardware control aspects of the kernel 210. Changes in functionality for block devices 224 is thus accomplished by loading an appropriate module 223 or 225.

Figure 3:
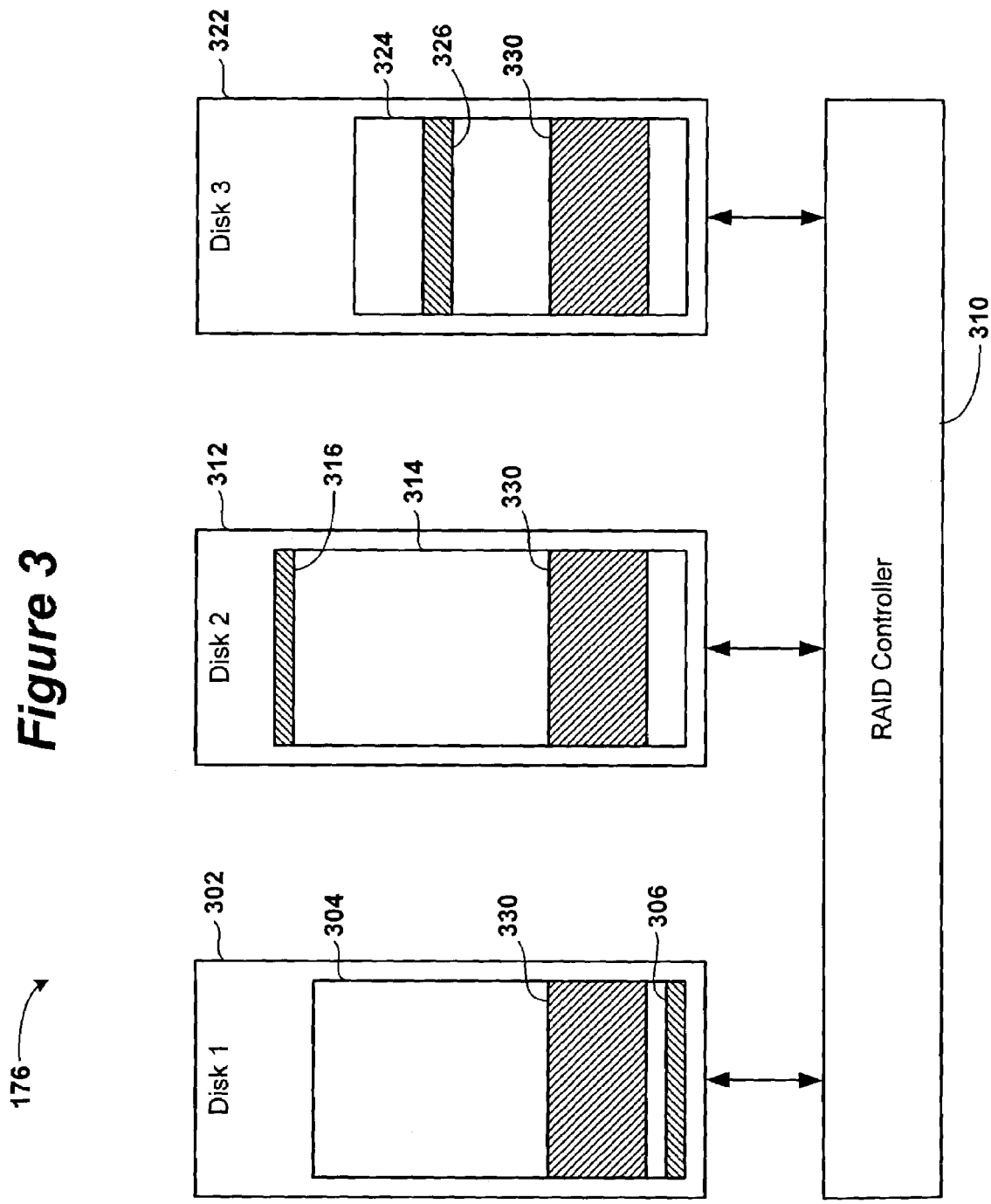
FIG. 3 is a block diagram illustrating a protocol-compliant RAID system according to the teachings of the present disclosure.

Shown in FIG. 3 is an embodiment of the present disclosure. Three hard disks 302, 312, and 322 are allocated to the RAID subsystem 176 as illustrated in FIG. 3. Each of the disks 302, 312, and 322 are controlled by the RAID controller 310. While the disks in questions are preferably SCSI disks, other types of disks (such as IDE hard disks) and other devices may also be used with corresponding effect. Each of the disks 302, 312, and 322 has a capacity 304, 314, and 324, respectively. As is standard in SCSI hard disks, disk-configuration information (about the disk itself or, in the prior art, the RAID information) is stored on the disk at locations such as the initial sectors (306), last sectors (316), or at an offset from the last sector (326) of disks 302, 312, and 322, respectively. The size and location of the disk-configuration information varies from manufacturer to manufacturer, as illustrated in FIG. 3. Moreover, the capacity 304, 314, and 324 can also vary from manufacturer to manufacturer, or from model to model within a particular manufacturer's line of devices.

In the prior art, hard disks allocated for RAID duty were selected from the same manufacturer so that the capacity and the disk-configuration location were consistent from disk to disk and thus could be matched to the RAID controller. Consequently, prior art RAID controllers could only use a subset of available hard disks. The requirement of uniform hard disks for RAID usage is remedied by the present disclosure.

In contrast to the prior art, the hard disks of the present disclosure need not have uniform capacities, or consistent disk-configuration locations. Instead, RAID configuration information is stored on each hard disk 302, 312, and 322 are stored in a specific location 330 that is separate from the disk-configuration locations 306, 316, and 326, respectively. Thus, each hard disk that obeys the protocol of this disclosure shall have a consistent RAID configuration location 330 with a specified portion of its hard disk devoted to RAID configuration information. The common location and common capacity of the RAID configuration location 330 ensures that each of the mass-storage devices 302, 12, and 322 will have sufficient capacity to store RAID configuration information, ensure that the RAID configuration is easily found regardless of the manufacturer of the mass-storage device, and that the RAID configuration location 330 is accessible using protocol-specific commands that also protect the location 330 from corruption by user programs and applications 242. While the use of three hard disks is shown in the embodiment of FIG. 3, one or more disks may be used with the protocol of the present disclosure. There is no limit to the number of disks that may be used, so long as sufficient (minimum) storage capacity is utilized for the RAID configuration portion 330.

In addition to having the RAID configuration information portion 330, each hard disk 302, 312, and 322 of the RAID subsystem 176 shall not allow user programs and applications 242 to access the RAID configuration portion 330 of each disk 302, 312, and 322 with, for example, standard READ and WRITE statements. Instead, each disk that obeys the protocol of this disclosure is configured so that the RAID configuration portion 330 is accessed with a special set of instructions. It is preferable, but not required, that the special set of instructions affect only the RAID configuration portion 330 of the various disks 302, 312, and 322. The special set of instructions would include those functions that add, modify, and/or delete RAID configuration information within the RAID configuration portion 330.

Figure 4:
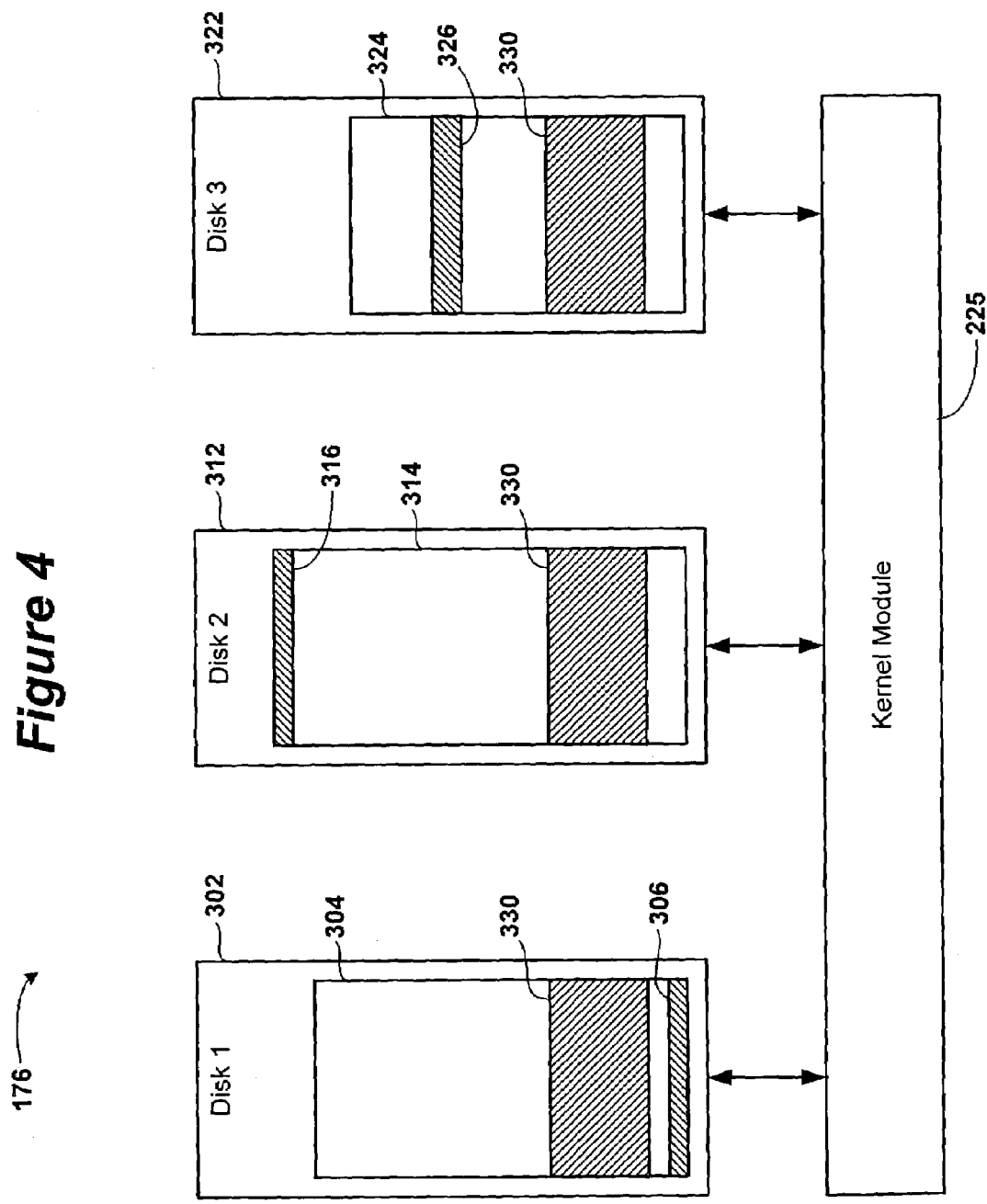
FIG. 4 is a block diagram illustrating an alternate embodiment of the protocol-compliant RAID system according to the teachings of the present disclosure.

Shown in FIG. 4 is an alternate embodiment of the disclosed apparatus. As before, the hard disks 302, 312, and 314, have disparate capacities 304, 314, and 324, respectively. Although the hard disks 302, 312, and 314 have different disk-configuration locations 306, 316, and 326, respectively, they all have commonly sized and placed RAID configuration portions 330 as illustrated in FIG. 4. Unlike the embodiment of FIG. 3, there is no RAID controller 310. Instead, in this alternate embodiment, the RAID controller is eliminated in favor of direct control by the operating system of the information handling system 100 by, for example, the kernel module 225. Still other embodiments may implement the protocol of the present disclosure through other mechanisms that are themselves implemented in software, in hardware, or some combination thereof.

According to the protocol of the present disclosure, the RAID configuration portion 330 contains one or more RAID configuration tables on one or more reserved tracks in, for example, one or more special drive log pages. The drive log pages are accessed using protocol-specific commands such as "LOG SENSE" and "LOG SELECT" instead of READ or WRITE statements that are used for accessing the user data space on the drive. Use of protocol-specific commands for the RAID configuration locations 330 ensures that the locations 330 are protected from corruption by user programs and applications 242. The user data space on the drives 302, 312, and 322 are essentially those portions of the drive capacity 304, 314, and 324, respectively, that do not contain disk-configuration locations 306, 316, and 326, respectively, or RAID configuration locations 330. Access to the protected RAID configuration portion 330 ensures that the RAID configuration information is not accidentally overwritten by a user application 242. Moreover, restricting access to the protected RAID configuration portion 330 from standard READ and WRITE statements would protect the RAID configuration tables if the RAID hard drive is accidentally connected to, for example, a plain SCSI controller. Additional protection for the RAID configuration portion 330 can be achieved by defining a write protect flag for the page or section making up the portion 330.

The RAID configuration log page for the portion 330 can be implemented by a change in, for example, the SCSI drive firmware. RAID vendors would have to support this new and well-defined portion 330 for storing RAID configuration data. Implementation of the protocol of the present disclosure would ensure enhanced standardization for RAID systems. Moreover, use of RAID configuration information on pages or portions 330 of the various drives allows replacement of one RAID controller with one of different manufacture without fear of affect existing user data. While the embodiments above mentioned the use of SCSI devices, other types of mass storage drives, such as Fibre Channel, server attached storage ("SAS"), network attached storage ("NAS") and advanced technology attachment ("ATA") drives are also candidates for the protocol of the present disclosure.

The protocol of the present disclosure can be implemented according to the method illustrated in FIG. 5. The method 500 begins generally at step 502. In step 504, a command is issued from the information handling system 100. Thereafter, in step 506, a check is made to determination if the command received by the RAID subsystem is a protocol-compliant command (i.e., the command will read or write to the RAID configuration location 330 of one or more of the mass-storage devices 302, 312, and/or 322). If the received command is protocol-compliant (e.g., it is a LOG SENSE, a LOG SELECT, or other protocol-compliant command) then step 508 is taken, wherein the received command is executed by one or more of the mass-storage devices. Otherwise, i.e., the result of step 506 is negative, the received command (e.g., a READ or WRITE) is executed and the method ends generally at step 512.

It should be recognized that the method described in the present disclosure is not limited to the manufacture of computer systems. Rather, the techniques described herein may be applied with equal effectiveness to a manufacturing process for any item.

Although the present disclosure has been described in detail, it should be understood that various changes, substitutions, and alterations can be made hereto without departing from the spirit and the scope of the invention as defined by the appended claims.

What is claimed is:
1. A RAID subsystem comprising:
multiple mass-storage devices, the multiple mass-storage devices configured according to a RAID configuration, wherein at least two of the multiple mass-storage devices are not identical in size, and wherein each mass-storage device includes disk configuration information and RAID configuration information;
wherein the RAID configuration of each of the multiple mass-storage devices is stored in the same, predetermined location in each of the multiple mass-storage devices;

wherein the RAID configuration information of each of the multiple mass-storage devices is stored separately from the disk configuration information of each of the mass-storage devices: and wherein the RAID configuration information of each of the multiple mass-storage devices includes information specific to the RAID configuration of the multiple mass-storage devices.

2. The RAID subsystem of claim 1, wherein each of the multiple mass-storage devices is selected from the group consisting of a SCSI drive, a server attached storage device, and a network attached storage device.

3. The RAID subsystem of claim 1, the subsystem further comprising a controller operative with each of one the multiple mass-storage devices.

4. The RAID subsystem of claim 1, the subsystem further comprising a kernel module operative with each of the multiple mass-storage devices.

5. The RAID subsystem of claim 1,
wherein each of the mass-storage devices is constructed and arranged to protect the location of the RAID configuration information from user applications; and
wherein the location of the RAID configuration information is protected by limiting access to the location of the RAID configuration information to a defined set of instructions.

6. The RAID subsystem of claim 1, wherein the RAID configuration information is accessed with a protocol-specific command.

7. The RAID subsystem of claim 6, wherein the protocol-specific command is a LOG SENSE command.

8. The RAID subsystem of claim 6, wherein the protocol-specific command is a LOG SELECT command.

9. The RAID subsystem of claim 1, wherein the storage location of the RAID configuration information of each of the multiple mass-storage devices has an equivalent capacity.

10. The RAID subsystem of claim 1, wherein the RAID configuration information of the multiple mass-storage devices contains one or more RAID configuration tables.

11. The RAID subsystem of claim 10, wherein the one or more RAID configuration tables are stored in one or more reserved tracks.

12. The RAID subsystem of claim 11, wherein the one or more reserved tracks are contained in one or more drive log pages.

13. An information handling system having a central processing unit, RAM operative with the central processing unit, and a RAID subsystem, the RAID subsystem comprising:
multiple mass-storage devices, each of the multiple mass-storage devices configured according to a RAID configuration, wherein at least two of the multiple mass-storage devices are not identical in size, and wherein each mass-storage device includes disk configuration information and RAID configuration information;

wherein the RAID configuration of each of multiple mass-storage devices is stored in the same, predetermined location in each of the multiple mass-storage devices;

wherein the RAID configuration information of each of the multiple mass-storage devices is stored separately from the disk configuration information of each of the mass-storage devices; and wherein the RAID configuration information of each of the multiple mass-storage devices includes information specific to the RAID configuration of the multiple mass-storage devices.

14. The information handling system of claim 13, wherein the mass-storage device is selected from the group consisting of a SCSI drive, a server attached storage device, and a network attached storage device.

15. The information handling system of claim 13, the subsystem further comprising a controller operative with each of the multiple mass-storage devices.

16. The information handling system of claim 13, the subsystem further comprising a kernel module operative with each of the multiple mass-storage devices.

17. The information handling system of claim 13,
wherein each of the mass-storage devices is constructed and arranged to protect the location of the RAID configuration information from user applications; and
wherein the location of the RAID configuration information is protected by limiting access to the location of the RAID configuration information to a defined set of instructions.

18. The information handling system of claim 13, wherein the RAID configuration information is accessed with a protocol-specific command.

19. The information handling system of claim 18, wherein the protocol-specific command is a LOG SENSE command.

20. The information handling system of claim 18, wherein the protocol-specific command is a LOG SELECT command.

21. The information handling system of claim 13, wherein the storage location of the RAID configuration information of each of the multiple mass-storage devices has an equivalent capacity.

22. The information handling system of claim 13, wherein the RAID configuration information of the multiple mass-storage devices contains one or more RAID configuration tables.

23. The information handling system of claim 22, wherein the one or more RAID configuration tables are stored in one or more reserved tracks.

24. The information handling system of claim 23, wherein the one or more reserved tracks are contained in one or more drive log pages.

* * * * *